June 8, 1937.  R. C. ROE  2,083,159
COMBINED HEATING AND COOLING DEVICE
Filed May 24, 1933  4 Sheets-Sheet 1
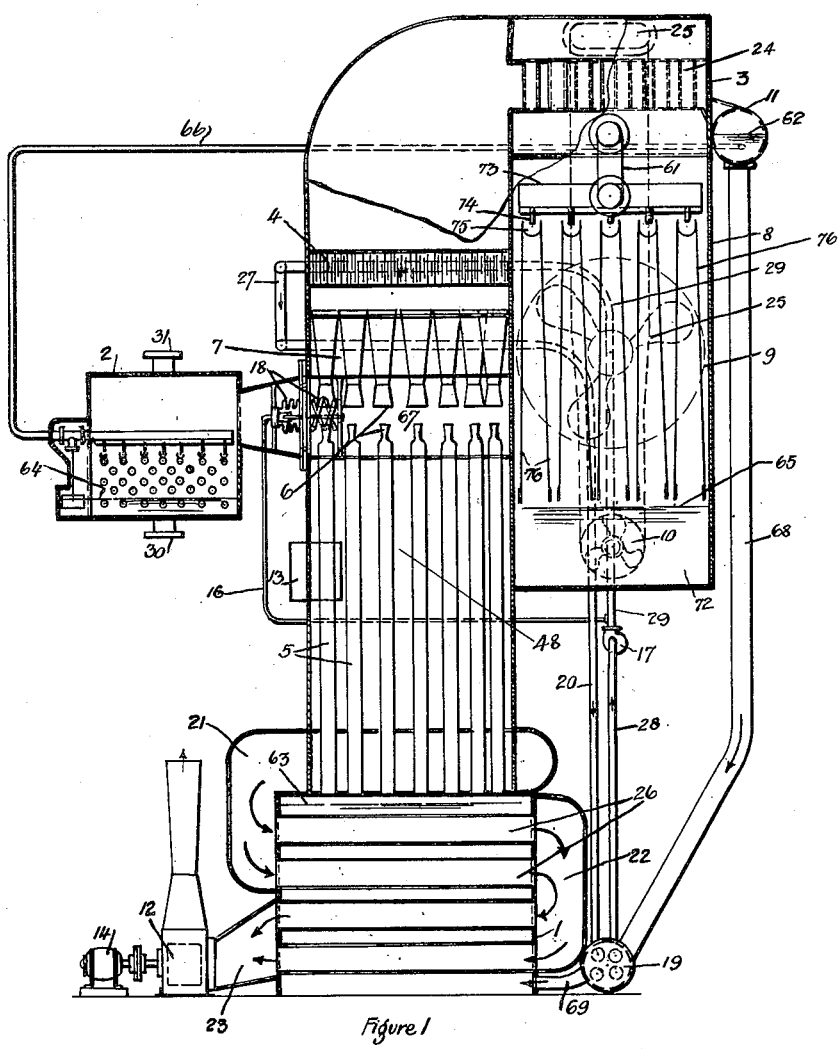
Figure 1
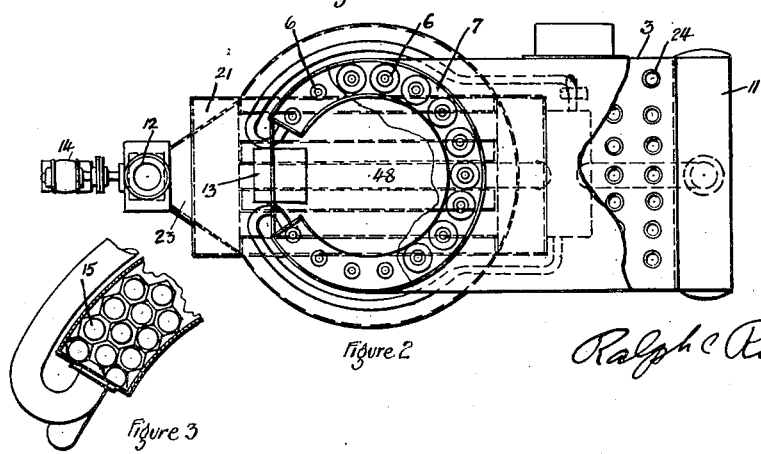
Figure 2
Figure 3
Ralph C. Roe INVENTOR- Ralph C. Roe INVENTOR June 8, 1937.  R. C. ROE  2,083,159
COMBINED HEATING AND COOLING DEVICE
Filed May 24, 1933  4 Sheets-Sheet 4

Ralph C Roe INVENTOR

Patented June 8, 1937

2,083,159

UNITED STATES PATENT OFFICE 2,083,159

COMBINED HEATING AND COOLING DEVICE

Ralph C. Roe, Englewood, N. J.

Application May 24, 1933, Serial No. 672,524

12 Claims. (Cl. 257—8)

My invention relates to improvements in air cooling, heating, humidification and dehumidication, and more particularly to devices of this function for cooling and heating rooms in residences and buildings. A further object of my invention is to provide means for cooling in the summer and heating in the winter in substantially the same apparatus. A still further object of my invention is to provide such means in a device which is actuated principally by fuel and in which the action of the fuel principally produces both the cooling and the heating. Other objects of my invention become apparent as the specifications appear and proceed.

The present methods of cooling, in most cases, consist of the use of the well known refrigerants such as methyl chloride, ammonia, etc. in refrigerating cycles with heat exchange surfaces placed in the rooms directly or indirectly, or by means of such surfaces placed in basements or other convenient locations, and ducts leading from such surfaces from the rooms and returning thereto. In my invention, I propose to use a harmless and readily available fluid, namely water, as a refrigerant and as a heating medium, and I further propose to use this water either directly with air or through a fluid circulating system heating and cooling a fluid to be circulated through a radiating surface in said rooms. The principles of water refrigeration are well known in the art and it is not my purpose to propose any claims as to the principles involved in water refrigeration per se. It is my purpose, however, to propose claims as to the particular method utilizing water refrigeration as provided in this invention whereby the same apparatus may be used for both cooling and heating.

Figure 4:
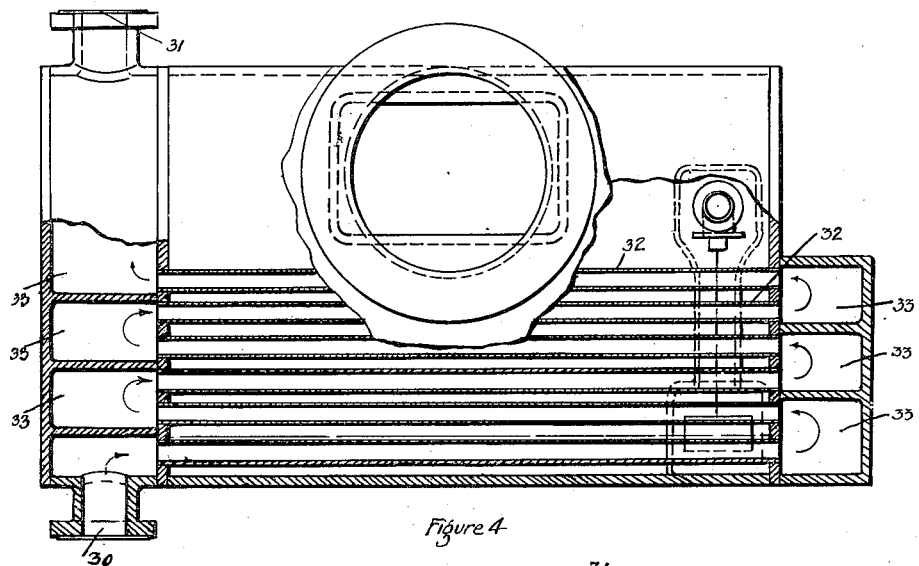
Figure 5:
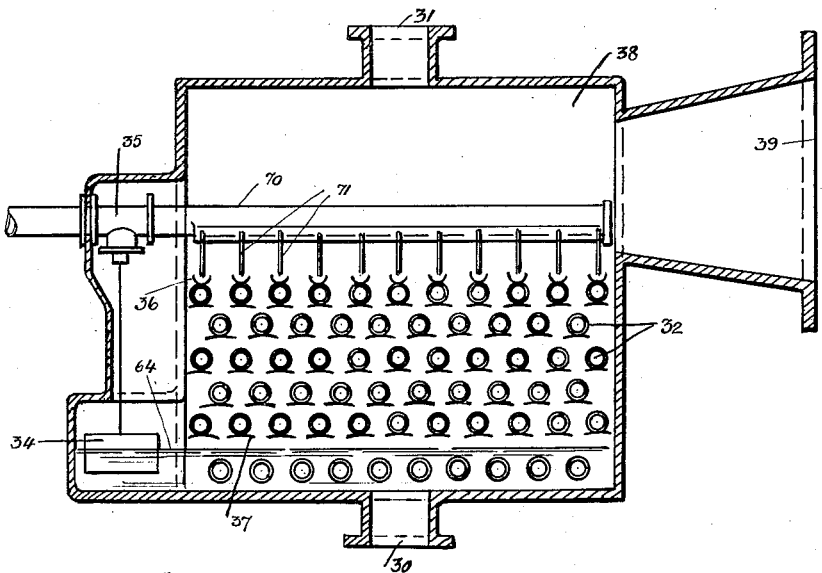
Figure 6:
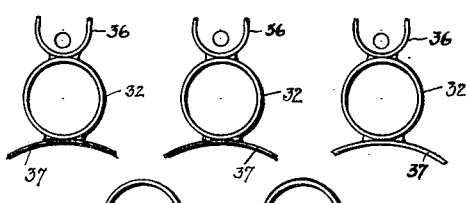
Figure 7:
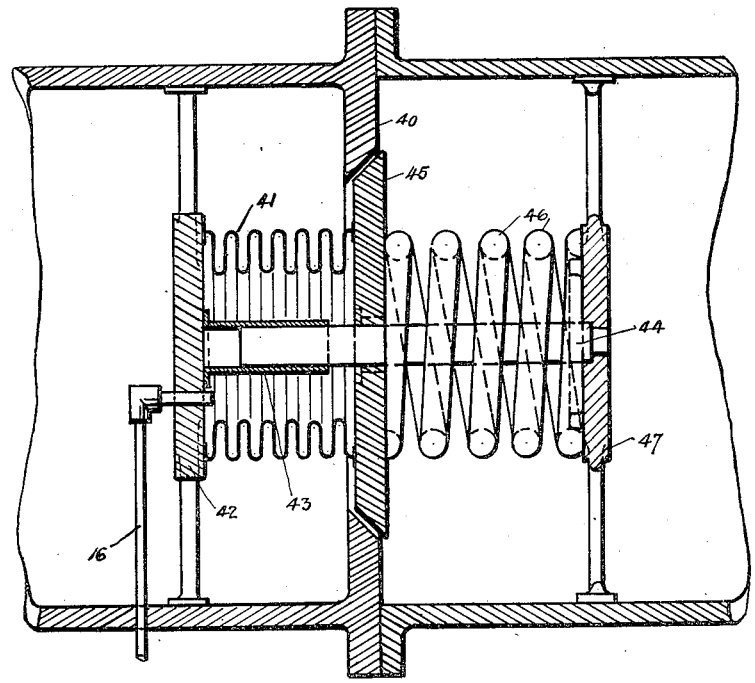
Figure 8:
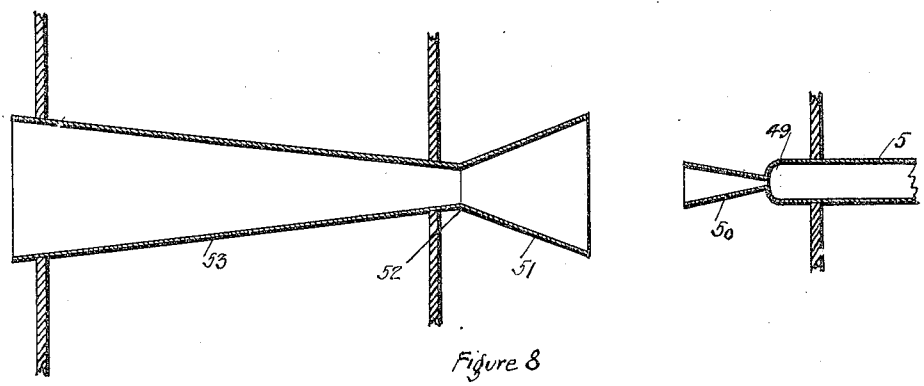
Figure 10:
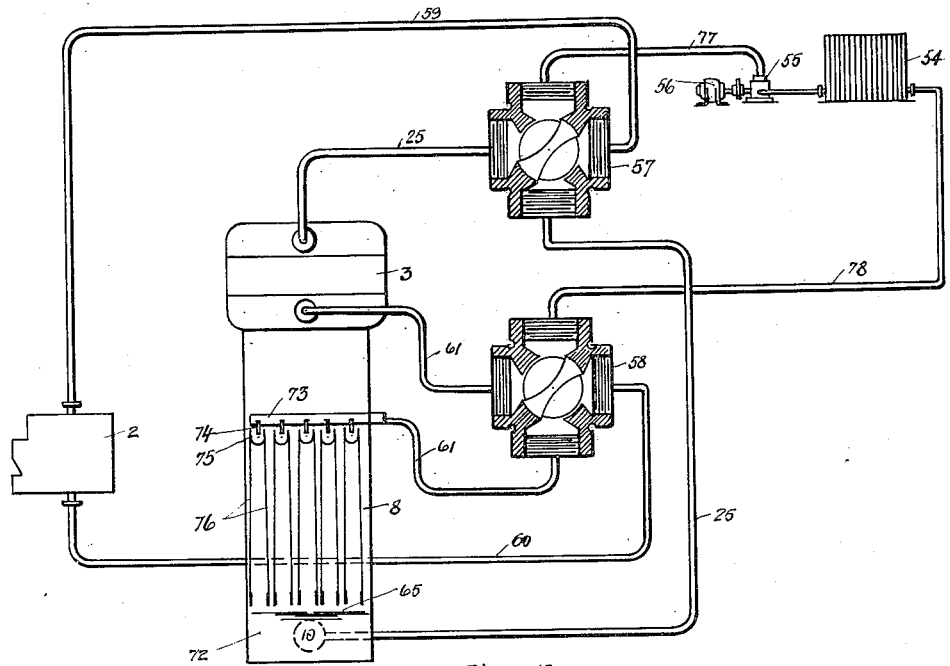
Figure 9:
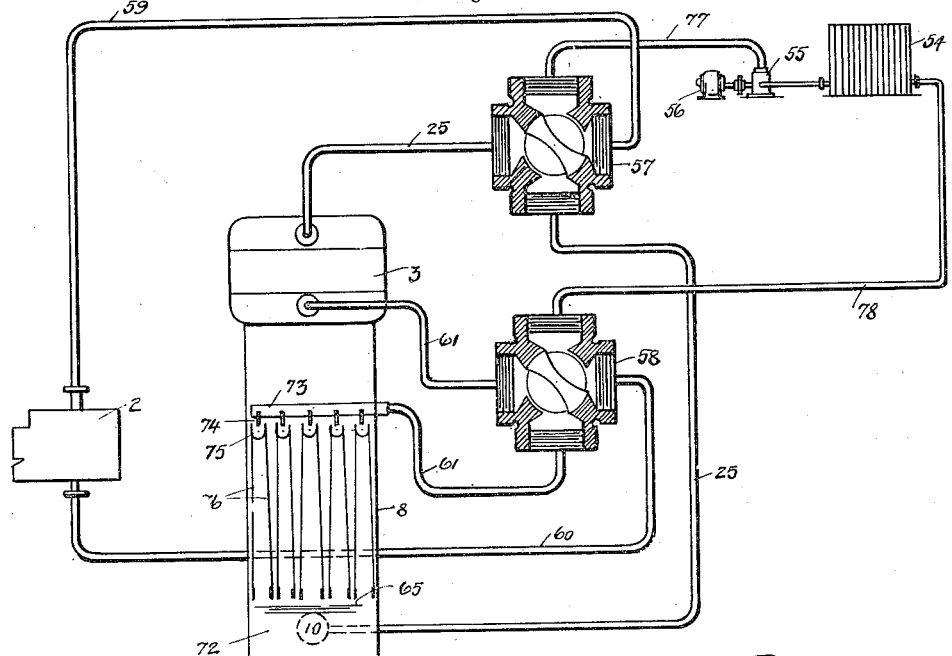

Referring to the drawings, Figure 1 is a diagrammatic elevation of a cross section of the principal portion of the apparatus, Figure 2 is a plan view of the principal portion of the apparatus as shown in Figure 1 with portions cut away to show interior parts, Figure 3 is a detail of heat exchanger 4 incorporated in Figures 1 and 2, Figure 4 is a longitudinal cross section of evaporator 2 in Figure 1, Figure 5 is a cross section of evaporator 2 as shown in Figure 1 taken at right angles to Figure 4, Figure 6 is a detail drawing of tubes in evaporator 2, Figure 7 is a detail drawing of a sylphon operated valve 18 as incorporated in Figure 1, Figure 8 is a detail drawing of steam jet pump which is incorporated in Figure 1, Figure 9 is a diagrammatic representation of the operating system as a whole showing the control valve arrangement as it would be in summer operation for cooling purposes, and Figure 10 is a diagrammatic representation of the system as a whole showing the control valve arrangement as it would be for winter operation for heating purposes.

In the figures, 1 is a boiler, 2 is an evaporator, 3 is a condenser, 4 is a heat exchanger, 5 are superheater tubes, 6 are jet pumps, 7 is a heat exchange means around discharge of jet pumps 6, 8 is an evaporator water cooler, 9 is an air fan for evaporator water cooler 8, 10 is a propeller pump, 11 is a water reservoir, part of condenser 3, 12 is an induced draft fan, 13 is a fuel burner in this case indicated as an oil burner, 14 is a motor, 15 is heat exchange surface in heat exchanger 4, 16 is a conduit, 17 is a pump, 18 is a pressure actuated sylphon valve, 19 is a heat exchanger, 20 is a conduit from heat exchange means 7 to heat exchanger 19, 21 is a gas flue, 22 is a gas flue, 23 is a gas flue, 24 are heat exchange tubes in condenser 3, 25 is a discharge conduit from pump 10 by way of valve 57 and the path shown in detail diagrammatically in Figures 9 and 10, 26 are boiler tubes in boiler 1, 27 is a conduit from heat exchanger 4 to heat exchange means 7, 28 is a conduit from heat exchanger 19 to pump 17, 29 is a conduit from pump 17 to heat exchanger 4, 30 is an inlet water connection to evaporator 2, 31 is an outlet water connection, 32 are heat exchange tubes in evaporator 2, see Figures 4 and 5, 33 are water boxes in evaporator 2, 34 is a float, 35 is a float valve controlling inlet water in evaporator 2, 36 are distribution troughs on the top row of tubes in evaporator 2, 37 are distribution plates on the bottom of tubes 32 in evaporator 2, 38 is a vapor space in evaporator 2, 39 is an outlet connection for evaporator 2, 40 is a stationary portion of sylphon valve 18, see Figure 7, 41 is sylphon bellows of valve 18, 42 is a stationary spider and end piece supporting sylphon bellows 41 in valve 18, 43 is the female portion of a guide internal to sylphon bellows 41, 44 is a valve stem continuing through into the portion of guide 43, 45 is a valve disc, 46 is a spring, 47 is a spring retaining spider supporting the other extremity of valve stem 44, (parts 40 to 47 inclusive make up valve 18), 48 is a combustion space or furnace, 49 is a nozzle to jet pump 6, 50 is a nozzle diffuser to jet pump 6, 51 is an inlet diffuser to jet pump 6, 52 is a throat to jet pump 6, 53 is an outlet diffuser to jet pump 6, 54 is a room radiator, 55 is a pump, 56 is a motor driving said pump, 57 and 58 are four way control valves in part controlling the change from heating to cooling operation, 59 is a conduit, 60 is a conduit, 61 is a conduit, 62 is a condenser water level, 63 is a boiler water level, 64 is an evaporator water level, 65 is a water level in evaporator water cooler, 66 is a return conduit from water reservoir 11 to evaporator 2, 67 is an ejecting chamber, 68 is a gravity supply conduit, 69 is a conduit between heat exchanger 19 and boiler 1, 70 is a distributing header for evaporator 2, 71 are distributing connections for evaporator 2, 72 is a water space in evaporator water cooler 8, 73 is a distributing header in evaporator water cooler 8, 74 are distributing connections in evaporator water cooler 8, 75 are distributing troughs in evaporator water cooler 8, 76 are water surface screens in evaporator water cooler 8, 77 is a conduit between pump 55 and valve 57, 78 is a conduit between radiator 54 and valve 58.

In both winter and summer operation in my preferred method a fluid, preferably water, is circulated by pump 55 through one or more radiators 54 located in the various rooms of the building, these radiators preferably being of the forced draft type, that is, air being mechanically forced over the same. The circulating fluid is either heated or cooled, as the case may be, by the main apparatus as will be hereinafter described and transmits heat to the atmospheric air in the room or absorbs heat from the atmospheric air in the room. It will be noted that condenser 3 is situated at a point of high elevation and that the water reservoir 11 is adjacent thereto.

Fuel is supplied to burner 13, together with proper air for combustion and is burned in combustion space 48, the gases transferring through flue connection 21, tubes 26 and connections 22 and 23 to induced draft fan 12 and thence to the exit flue.

In operation as a cooling device, water from 11 flows through conduit 68, heat exchanger 19, conduit 69 to boiler 1 where it is vaporized from the hot gases produced by fuel burner 13 flowing through tubes 26, the vapor passing upward through superheater tubes 5 in contact by both convection and radiation with the flame from fuel burner 13 where it is superheated and passes out through nozzle 49 and diffuser 50 of jet pump 6, entering inlet diffuser 51 and thence through throat 52 and diffuser 53. The steam passing through jet pumps 6 at high velocity entrains therewith vapors produced in evaporator 2 and compresses them to the pressure of condenser 3. In passing through diffuser 53, it is surrounded by a fluid in heat exchange means 7 which absorbs a portion of the heat of compression. More of this heat of compression is absorbed when passing through heat exchanger 4 and the steam is finally condensed in condenser 3 and returns in liquid form to water reservoir 11, thence flowing through conduit 68, heat exchanger 19, conduit 69 to boiler 1.

The cooling fluid is circulated by means of pump 55 driven by motor 56 through radiator 54, valve 57 as shown in Figure 9 to evaporator 2 where this fluid is cooled by releasing some of the heat absorbed in radiator 54, giving up this heat to evaporator 2. The cooled fluid then passes through conduit 60, valve 58, conduit 78 back to radiator 54 where it reabsorbs heat and repeats the cycle.

A portion of the water from water reservoir 11 flows through conduit 66 and enters evaporator 2 under the control of float 34 and float valve 35 where it is distributed via distributing header 70 and distributing connections 71 to distributing troughs 36 where it overflows these troughs at their perimeter and flows over surface of tubes 32 and is redistributed by distribution plates 37 to the next succeeding tubes and thence on downward in the evaporator. The refrigerant (water) lying in a very thin film over the tube surface and being under high vacuum by the action of jet pumps 6 is evaporated at a comparatively low temperature, say 50 deg., and any unevaporated portion accumulates in the bottom of the evaporator in accordance with the water level indicated by 64. This water level actuates float 34 which in turn actuates valve 35 to maintain only a flow of refrigerant (water) into evaporator 2 as may be evaporated and maintains approximately this level and no more. The circulating fluid passing through the tubes of evaporator 2 is therefore cooled by the evaporation of the refrigerant (water) within evaporator 2 and the heat in said circulating fluid goes into evaporator 2 in the form of latent heat of vaporization of said refrigerant. This vaporized refrigerant passes through vapor space 38 and outlet connection 39 through the open sylphon control valve 18 to ejecting chamber 67 where it is entrained with impelling steam issuing from nozzles 49 and diffuser 50 and after being compressed by said impelling steam is condensed as hereinbefore explained in condenser 3 returning to reservoir 11 where that portion of it which has been evaporated from evaporator 2 returns thereto by conduit 66 regulated by float 34 and float valve 35, and the balance as heretofore explained returns to boiler 1, the division of these two fluids being controlled as herein described.

Sylphon control valve 18 is normally closed when the apparatus is not operating as a refrigerating device but when the apparatus is operating as a refrigerating device the fluid pressure produced by pump 17 passes through conduit 16 to the interior of sylphon bellows 41 producing pressure in said sylphon bellows and separating valve disc 45 from stationary portion 40 of sylphon valve 18 against the pressure of spring 46. When the apparatus is stopped and pump 17 fails to produce pressure, then there is no pressure in the sylphon bellows 41 and spring 46 returns valve disc 45 to stationary portion 40 of sylphon valve 18 and closes the opening. This arrangement prevents the back-flow of heat from ejecting chamber 67 to evaporator 2 during the shut down periods of the apparatus and therefore prevents circulating fluid passing through evaporator 2 taking up any heat from this source.

The starting and stopping of fuel burner 13 and of fan 9, pump 17, etc. will be controlled by thermostatic means from the room.

In operation, the condenser water supply is maintained in water space 72 of evaporator water cooler 8 and is pumped by propeller pump 10 through conduit 25 in Figure 9 via valve 57 to condenser 3 where it flows by gravity through tubes 24 and thence by conduit 61 via valve 58 to distributing header 73, distributing connections 74, distributing troughs 75 and water surface screens 76 and thence by gravity returning to water space 72. In passing through condenser 3 the vapors are condensed in the vapor space of said condenser and the latent heat of condensation is absorbed as specific heat of water and when the pressure of the water is slightly reduced by flowing through distributing header 73 connections 74 and over troughs 75 to screens 76 this specific heat is transferred to latent heat by the vaporization of a portion of the water passing over said screens. Fan 9 circulates air at right angles to said water flow on said screens 76 and conveys the vaporized portion of said water to the atmosphere by means of a flue, not illustrated, and said water passing over screens 76 is cooled not only by contact with said air handled by fan 9 but also by the vaporization of a portion of said water. Water is replenished in water space 72, as needed, from city water supplies or otherwise.

To improve the efficiency of the above described cycle, a fluid is circulated by pump 17 via conduit 29 through heat exchanger 4, where a portion of the specific heat of the steam emitted from steam jet 6 is exchanged to specific heat of liquid in heat exchanger 4 and thence by conduit 27 to heat exchange means 7 where a further portion of the specific heat of said vapor is exchanged for heat of liquid and thence via conduit 20 to heat exchanger 19 where said heat is released to heat the incoming water to boiler 1 and thence by conduit 28 to pump 17, the above being a continuous recirculating cycle, the effect of this cycle being to take a portion of the heat of compression out of the vapors from jets 6 and convey it to the feed water entering boiler 1.

From the above, it will be seen that energy supplied by fuel is made to produce refrigeration by a new kind of water refrigeration apparatus with a single fluid as a refrigerant and with gravity supplying the pressure to actuate the jets, that is the head of water between water reservoir 11 and boiler 1 produces the pressure or head to cause flow of steam emitted from boiler 1 through tubes 5 and jet pumps 6, a portion of the energy imparted by the heat from fuel burner being utilized in jet 6 for the purpose of producing a difference in pressure between evaporator 2 and condenser 3.

It will be noted that the apparatus is hermetically sealed and pre-vacuumized and contains nothing but water and its vapor. The water may be put in in the form of pure distilled water and may be continually used over and over without appreciable loss or replenishment and at atmospheric temperatures and during the time of refrigeration operation the entire system operates under low pressures, such as .1780# absolute in the evaporator and .946# absolute in the condenser. The boiler itself operates under a higher pressure such as 3.196# absolute, the differential between the condenser and the boiler being supplied by the static head of the water between reservoir 11 and boiler 1. Superheater tubes 5 being very large and direct, there is practically no loss, therefore superheated steam enters jet 6 at practically boiler pressure and is expanded through nozzle 49 and diffuser 50 into inlet diffuser 51 at very high velocity making available considerable energy for the compression of the vapors from evaporator 2. The heat absorbing surface and therefore the superheat given to the steam in tubes 5 will be such that the steam emitted from diffuser 50 will be practically at saturation which will also be the condition of the incoming steam from evaporator 2. These two steams being of the same quality, that is both in a saturated condition, permit an ease of mixture which has heretofore been impractical and increase the efficiency of jet pumps 6 thereby.

It is readily seen that by this method refrigeration is produced by the action of fuel in fuel burner 13 with a single fluid, that is water, both as a refrigerant and as an impelling fluid, in a totally enclosed and sealed system without the necessity of using two fluids for this purpose, or the necessity of using anything other than gravity for boiler feed purposes. This is believed to be entirely new and novel in the art and a distinct advance thereto.

For heating service as distinguished from refrigerating service, pumps 10 and 17 and fan 9 do not operate. Inasmuch as pump 17 does not operate, sylphon valve 18 remains closed by action of spring 46. In Figure 10 for heat operation, valves 57 and 58 are changed in position as compared with Figure 9 for cooling operation. In this case, circulating fluid in the heating system, preferably water, passes through radiator 54 and is pumped by pump 55 driven by motor 56 and is passed through valve 57, a portion of conduit 25, condenser 3, a portion of conduit 61, valve 58, conduit 78 to radiator 54. Fuel is supplied as before through fuel burner 13 heating, evaporating and superheating water which passes from boiler 1, through superheater tubes 5, jets 6 to condenser 3. In passing through jets 6 during heating operation of the apparatus, the steam does no work inasmuch as sylphon valve 18 is closed. The total steam, however, is condensed in condenser 3 and the latent heat thereof is transferred as specific heat of the circulating fluid passing through said condenser as just described and thence passes to the rooms giving up its heat through radiator 54. The condensed water flows into water reservoir 11, thence through conduit 68 and heat exchanger 19, conduit 69 to boiler 1, where the cycle is repeated. It is therefore seen that the heat of fuel from burner 13 is transmitted to the rooms for heating purposes. The water internal to the apparatus as previously mentioned is permanently sealed therein and pre-vacuumized.

In heating operation, the pressure the apparatus works under will vary with the temperature required in the circulating fluid which in turn will be determined by the heat requirements of the rooms. This pressure will be, therefore, a variable one from fairly high vacuum up to and including atmospheric pressure or slightly above.

It is thus seen that this apparatus can be used for either heating or cooling by the mere change of valves 57 and 58 and by the proper arrangements of driving mechanism for the pumps before enumerated so that a single apparatus can therefore be used for the combined purpose of cooling and heating rooms as the weather conditions and locality may dictate.

I claim:

1. In a system for treating an objective to be alternatively refrigerated and heated, refrigerating means including an evaporator, a boiler, means connected to receive fluid from the boiler and to withdraw fluid from the evaporator during cooling of the objective, common condensing means for condensing fluid withdrawn by the second mentioned means from the evaporator during cooling of the objective and for delivering heat to said objective during heating thereof, and means for preventing withdrawal of fluid from said evaporator during heating of the objective.

2. In a system for treating an objective to be alternatively refrigerated and heated, refrigerating means including an evaporator, heat transfer means between said evaporator and said objective, a boiler, means connected to receive fluid from said boiler and to withdraw fluid from said evaporator during cooling of the objective, condensing means for condensing fluid withdrawn from said evaporator during cooling of the objective, heat transfer means between said condenser and said objective, and means for preventing withdrawal of fluid from said evaporator during heating of the objective.

3. The method of alternatively heating and cooling an objective which includes heating a first body of liquid to produce vapor, superheating the vapor, increasing the velocity and reducing the pressure of the vapor, condensing the vapor, returning the condensate to said first body, causing evaporation from a second body of liquid due to said reduction in pressure and increase in velocity and discarding the heat of condensation when cooling is desired, and utilizing the heat of condensation of the vapor as a heating medium for the objective when heating thereof is desired.

4. The method of alternatively heating and cooling an objective which includes heating a first body of water to produce steam, superheating the steam, producing a jet of the superheated steam, maintaining the superheat temperature so high as to prevent water formation in the jet, condensing the jet steam, returning the condensate to said body, inducing flow of water vapor from above a second body of water to cause evaporation thereof due to the jet steam, cooling the jet steam and discarding the heat of condensation when cooling is desired, and discontinuing the induced flow of vapor, discontinuing cooling of the jet steam and utilizing the heat of condensation of the vapor as a heating medium for the objective when heating thereof is desired.

5. The method of alternatively heating and cooling an objective which includes heating a first body of water to produce steam, superheating the steam, producing a jet of the superheated steam, maintaining the superheat temperature so high as to prevent water formation in the jet, condensing the jet steam, returning the condensate to said body, inducing flow of water vapor from above a second body of water to cause evaporation thereof due to the jet steam, cooling the jet steam, discarding the heat of condensation and circulating water between the second body and the objective of refrigeration when cooling is desired, and discontinuing the induced flow of vapor, discontinuing cooling of the jet steam and circulating water in heat exchange relation with the condensate and the objective when heating thereof is desired.

6. In apparatus for heating or cooling of fluid, the combination of a boiler, fuel burning means for heating said boiler, said boiler having water therein adapted to be vaporized by application of heat thereto, vapor actuated jet pumps connected to receive vapor from said boiler, an evaporator in heat exchange relation with fluid to be cooled and connected to said jet pumps, means to supply water to said evaporator as a refrigerant to be vaporized therein, said jet pumps being adapted to compress said vapor, condensing means for condensing said vapors, return means from said condenser for returning condensed vapor to said evaporator supply means, gravity return means from said condenser for returning condensed vapor to said boiler, and changeable alternate means for placing said fluid in heat exchange relation with said condenser for condensing the water vaporized by application of heat to thereby heat said fluid.

7. In apparatus for heating or cooling of fluid, the combination of a boiler, fuel burning means for heating said boiler, said boiler having water therein adapted to be vaporized by application of heat thereto, vapor actuated jet pumps connected to receive vapor from said boiler, an evaporator in heat exchange relation with fluid to be cooled and connected to said jet pumps, means to supply water to said evaporator as a refrigerant to be vaporized therein, said jet pumps being adapted to compress said vapor, externally actuated cut off means between said evaporator and said jet pumps, condensing means for condensing said vapors, return means from said condenser for returning condensed vapor to said evaporator supply means, gravity return means from said condenser for returning said condensed vapor to said boiler, and changeable alternate means for placing said fluid in heat exchange relation with said condenser for condensing said water vaporized by application of heat to thereby heat said fluid.

8. In apparatus for heating or cooling of fluid, the combination of a boiler, fuel burning means for heating said boiler, said boiler having water therein adapted to be vaporized by application of heat thereto, superheating means connected to said boiler in heat receiving relation with said fuel burning means, vapor actuated jet pumps connected to receive vapor from said superheating means, an evaporator in heat exchange relation with fluid to be cooled and connected to said jet pumps, means to supply water to said evaporator as a refrigerant to be vaporized therein, said jet pumps being adapted to compress said vapor, condensing means for condensing said vapors, return means from said condenser for returning condensed vapor to said evaporator supply means, gravity return means from said condenser for returning condensed vapor to said boiler, and changeable alternate means for placing said fluid in heat exchange relation with said condenser for condensing said vapor produced by application of heat to thereby heat said fluid.

9. A hermetically sealed refrigerating and heating system in heating or cooling relation with a fluid, permanently void of all gases except vapor of a refrigerant or heating fluid comprising in combination, a boiler, fuel burning means for heating said boiler, said boiler having water therein adapted to be vaporized due to heat applied thereto, vapor actuated jet pumps connected to receive vapor from said boiler, an evaporator in heat exchange relation with the fluid to be cooled and connected to said jet pumps, means to supply water to said evaporator as a refrigerant to be vaporized therein, said jet pumps being adapted to compress said vapor, condensing means for condensing said vapors, return means from said condenser for returning condensed vapor to said evaporator, gravity return means from said condenser for returning said condensed vapor to said boiler, and changeable alternate means for placing said fluid in heat exchange relation with said condenser for condensing said water vaporized by application of heat to thereby heat said fluid.

10. A permanently vacuumized, hermetically sealed refrigerating and heating system in heating or cooling relation with a fluid, comprising in combination, a boiler, fuel burning means for heating said boiler, said boiler having water therein adapted to be vaporized by application of heat thereto, vapor actuated jet pumps connected to receive vapor from said boiler, an evaporator in heat exchange relation with the fluid to be cooled and connected to said jet pumps, means to supply water to said evaporator as a refrigerant to be vaporized therein, said jet pumps being adapted to compress said vapor, condensing means for condensing said vapors, return means from said condenser for returning condensed vapor to said evaporator, gravity return means from said condenser for returning said condensed vapor to said boiler, and changeable alternate means for placing said fluid in heat exchange relation with said condenser for condensing said water vaporized by application of heat to thereby heat said fluid.

11. In apparatus for heating or cooling of fluid, the combination of a boiler, fuel burning means for heating said boiler, said boiler having water therein adapted to be vaporized by application of heat thereto, vapor actuated jet pumps connected to receive vapor from said boiler, an evaporator in heat exchange relation with fluid to be cooled and connected to said jet pumps, means to supply water to said evaporator as a refrigerant to be vaporized therein, said jet pumps being adapted to compress said vapor, condensing means for condensing said vapors, return means from said condenser for returning condensed vapor to said evaporator, gravity return means from said condenser for returning said condensed vapor to said boiler, means for exchanging heat between steam compressed by said jet pumps and water supplied to said boiler, and changeable alternate means for placing said fluid in heat exchange relation with said condenser for condensing said water vaporized by application of heat to thereby heat said fluid.

12. In a system for treating an objective to be alternatively refrigerated and heated, refrigerating means including an evaporator, a boiler, means connected to receive fluid from the boiler and to withdraw fluid from the evaporator during cooling of the objective, common means for condensing fluid withdrawn by the second mentioned means from the evaporator during cooling of the objective and for delivering heat to said objective during heating thereof, means for conveying condensate from said common means to said boiler, and means for preventing withdrawal of fluid from said evaporator during heating of the objective.

RALPH C. ROE.